United States Patent

Nakamura

Patent Number: 5,801,507
Date of Patent: Sep. 1, 1998

[54] ACCELERATION SENSOR

[75] Inventor: Takeshi Nakamura, Uji, Japan

[73] Assignee: Murata Manufacturing Co., Ltd., Japan

[21] Appl. No.: 653,378

[22] Filed: May 24, 1996

[30] Foreign Application Priority Data

May 26, 1995 [JP] Japan ................. 7-152465

[51] Int. Cl.$^6$ ................. G05B 11/12
[52] U.S. Cl. ................. 318/648; 318/651; 74/1.75; 74/382 R; 74/514.01
[58] Field of Search ................. 318/648, 649, 318/651, 584–587; 73/1.75, 1.77, 382 R, 514.01, 514.23, 514.34, 514.35

[56] References Cited

U.S. PATENT DOCUMENTS 3,537,307  11/1970  Pliha.

FOREIGN PATENT DOCUMENTS

| 4142058A1 | 8/1992 | Germany. |
| 4322034A1 | 9/1994 | Germany. |
| 4260983 | 9/1992 | Japan. |
| 6168972 | 6/1994 | Japan. |
| 9505576 | 2/1995 | WIPO. |

*Primary Examiner*—Brian Sircus
*Attorney, Agent, or Firm*—Ostrolenk, Faber, Gerb & Soffen, LLP

[57] ABSTRACT

An acceleration sensor includes a first acceleration sensor and a second acceleration sensor both disposed neither parallel to the plumb plane nor perpendicularly to the plumb plane, wherein the first acceleration sensor and the second acceleration sensor are disposed such that they are symmetrical to each other with reference to the plumb plane. A summing circuit is provided for obtaining the sum of an output signal of the first acceleration sensor and an output signal of the second acceleration sensor, and a differential circuit for obtaining the difference between the respective output signals of the first acceleration sensor and the second acceleration sensor, so that acceleration in the horizontal direction is obtained from one of the output signals of the summing circuit and the differential circuit, and the gravitational acceleration is obtained from the other of the output signals of the summing circuit and the differential circuit. Also provided is a control system for controlling the positions of the first acceleration sensor and the second acceleration sensor so as to maximize the output signal corresponding to the gravitational acceleration.

9 Claims, 5 Drawing Sheets

GRAVITATIONAL ACCELERATION    GRAVITATIONAL ACCELERATION

ACCELERATION IN HORIZONTAL DIRECTION

ACCELERATION IN HORIZONTAL DIRECTION

ACCELERATION SENSOR

BACKGROUND OF THE INVENTION

1. Field of the Invention

The present invention relates to acceleration sensors, and more particularly, for example, to an acceleration sensor for use in a car for obtaining the car speed and travel distance in a navigation system or the like.

2. Description of the Related Art

There is known, for example, an apparatus serving as a car navigation system in which the location of a car is displayed with a cursor or the like on a map and the cursor is moved as the car travels. In such an apparatus, it is necessary to detect the rotation angle of a car, and the car speed or the travel distance. An angular-velocity sensor, for example, is used for detecting the rotation angle of a car. To detect the car speed or the travel distance, an acceleration sensor is used.

The acceleration sensor is mounted such that its acceleration detection surface is oriented toward the direction in which a car moves. When the car moves in this condition, a force is applied in the direction perpendicular to the surface where acceleration is detected in the acceleration sensor, and a signal corresponding to that force is output. Therefore, by measuring the signal output from the acceleration sensor, the car acceleration can be detected. And then, the travel speed and travel distance can be obtained by integrating the acceleration.

When the car is slanted on a slope or the like, however, the gravitational acceleration is also applied to the acceleration sensor, and the acceleration caused by the travel of the car cannot be correctly detected. For example, in a case where the car is slanted forward by 0.5 degrees, the acceleration sensor incorrectly detects an acceleration caused by the slant as being movement of the car. Such a minute inclination can also be generated when a person gets into or out of the car, causing an error. When the car is slanted at about 12°, even if the car is stopped, the same acceleration is detected as that detected when the car moves with a rapid acceleration.

In order to solve this problem, a method has been considered for compensating for the influence of the gravitational acceleration by mounting another acceleration sensor, perpendicularly to the acceleration sensor which detects the acceleration in the travel direction, and detecting the gravitational acceleration with the new acceleration sensor.

However, the new acceleration sensor is required to have absolute precision in order to perform such compensation. Moreover, when the sensitivity changes due to changes in the ambient temperature or the like, the detected travel speed and travel distance have errors. In the acceleration sensor for compensation, for example, a sensitivity of $10^{-5}$ to $10^{-6}$ and high stability against ambient conditions are required, and such an acceleration sensor is expensive. When such an acceleration sensor for compensation is used, vibration during travel is also detected in addition to the gravitational acceleration. Accordingly, it is difficult to detect acceleration in the travel direction correctly by using such a method.

In addition, such a conventional acceleration sensor for detecting acceleration in the car travel direction is only capable of integrating the detected acceleration and giving the distance actually traveled. However, a map display used in a navigation system is a two-dimensional plan view, and requires a horizontal distance to be obtained by ignoring the slope of the road, in order to display the location of a car on the map. Therefore, when the actual travel distance is measured by the conventional method, it is necessary to perform additional calculations in order to obtain the horizontal travel distance.

SUMMARY OF THE INVENTION

It is an object of the present invention to provide an acceleration sensor which easily disregards the influence of the gravitational acceleration and accurately obtains the acceleration in the horizontal direction.

According to a preferred embodiment of the invention, an acceleration sensor includes a first acceleration sensor and a second acceleration sensor both disposed neither parallel to the plumb plane nor perpendicularly to the plumb plane, wherein the first acceleration sensor and the second acceleration sensor are disposed such that they are symmetrical to each other with reference to the plumb plane.

The acceleration sensor may be configured such that the sensor further comprises a summing circuit for obtaining the sum of the output signals of the first acceleration sensor and the second acceleration sensor, and a differential circuit for obtaining the difference between the output signals of the first acceleration sensor and the second acceleration sensor, wherein acceleration in the horizontal direction is obtained from one of the output signals of the summing circuit and the differential circuit, and the gravitational acceleration is obtained from the other of the output signals of the summing circuit and the differential circuit.

It is preferred that the acceleration sensor have a control system for controlling the positions of the first acceleration sensor and the second acceleration sensor such that the output signal corresponding to the gravitational acceleration obtained from either of the summing circuit and the differential circuit is maximized.

Since the first acceleration sensor and the second acceleration sensor are disposed neither parallel to the plumb plane nor perpendicularly to the plumb plane, and are symmetrical to each other with reference to the plumb plane, the gravitational acceleration applies at the same angle to the detection surfaces of the two acceleration sensors. Therefore, the gravitational acceleration can be offset by measuring one of the sum of or the difference between the output signals of these acceleration sensors. Whether the sum of the output signals of the two acceleration sensors or the difference between them is measured depends on the polarities of the output signals of the two acceleration sensors.

By measuring the other of the sum of or the difference between the output signals of the two acceleration sensors, an output signal having no acceleration component in the horizontal direction and corresponding only to the gravitational acceleration is obtained. The point where this signal corresponding to the gravitational acceleration is at its maximum corresponds to the position where the two acceleration sensors are symmetrical with reference to the plumb plane. Therefore, by controlling the positions of the two acceleration sensors such that the signal corresponding to the gravitational acceleration becomes the maximum, the two acceleration sensors are always disposed symmetrically with reference to the plumb plane.

According to the preferred embodiment of the present invention, the gravitational acceleration can be offset, and a signal corresponding to acceleration only in the horizontal direction can be obtained. Therefore, by integrating this signal, the travel speed and the travel distance can be obtained. When this acceleration sensor is used in a car navigation system or the like, the influence of the gravitational acceleration can be removed without using an expensive acceleration sensor. In addition, since vibration generated in a car has the same direction as the gravitational acceleration, the influence of such vibration can be also removed. Moreover, because the acceleration obtained by this acceleration sensor is acceleration in the horizontal direction, the location of the car can be displayed on a map correctly without compensation.

Furthermore, since the two acceleration sensors can be disposed at the most appropriate positions with the use of the control system, acceleration only in the horizontal direction can always be detected even when the car moves on a slope.

For the purpose of illustrating the invention, there are shown in the drawings several forms which are presently preferred, it being understood, however, that the invention is not limited to the precise arrangements and instrumentalities shown.

DETAILED DESCRIPTION OF PREFERRED EMBODIMENTS

Hereinafter, preferred embodiments of the present invention will be explained in detail with reference to the drawings.

Figure 1:
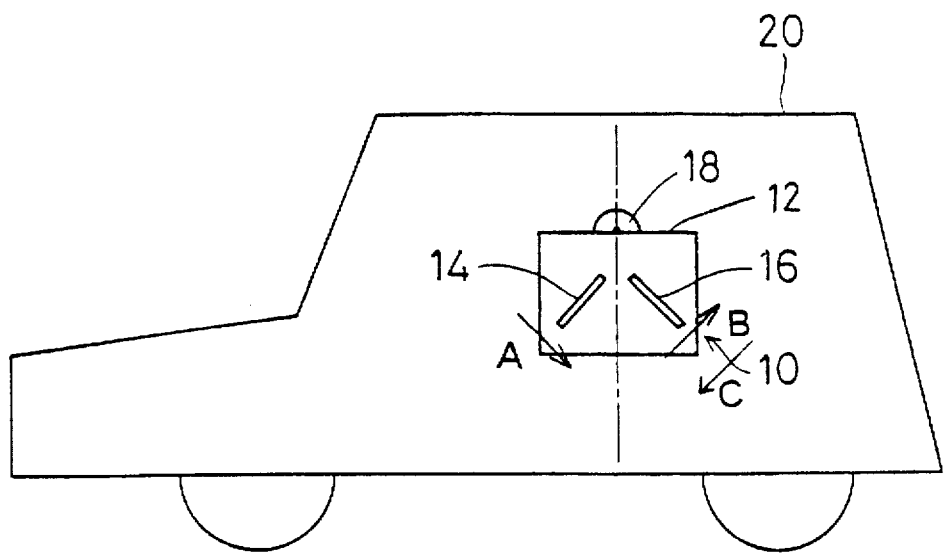
FIG. 1 is a view illustrating an embodiment of the present invention.

FIG. 1 is a view illustrating an embodiment of the present invention. An acceleration sensor 10, for example, includes a case 12. In the case 12, a first acceleration sensor 14 and a second acceleration sensor 16 are mounted. The first and second acceleration sensors 14 and 16 are disposed such that they are inclined in opposite directions with respect to a plumb plane and it is preferable that they form respective angles of 45° with respect to the plumb plane, which is indicated by a short-and-long-dotted line. These acceleration sensors 14 and 16 are disposed such that they are symmetrical with reference to the plumb plane.

As shown in FIG. 1, the acceleration sensors 14 and 16 are oriented so that they output signals of the same polarity when the acceleration sensors 14 and 16 are subjected to forces in the directions shown by arrows A and B, respectively.

The case 12 is mounted, for example, on a servomotor 18. This acceleration sensor 10 is mounted on a car 20 or the like, for example, as a part of a navigation system. The angle of the case 12 is adjusted with respect to the car 20 by the servomotor 18.

Figure 2:
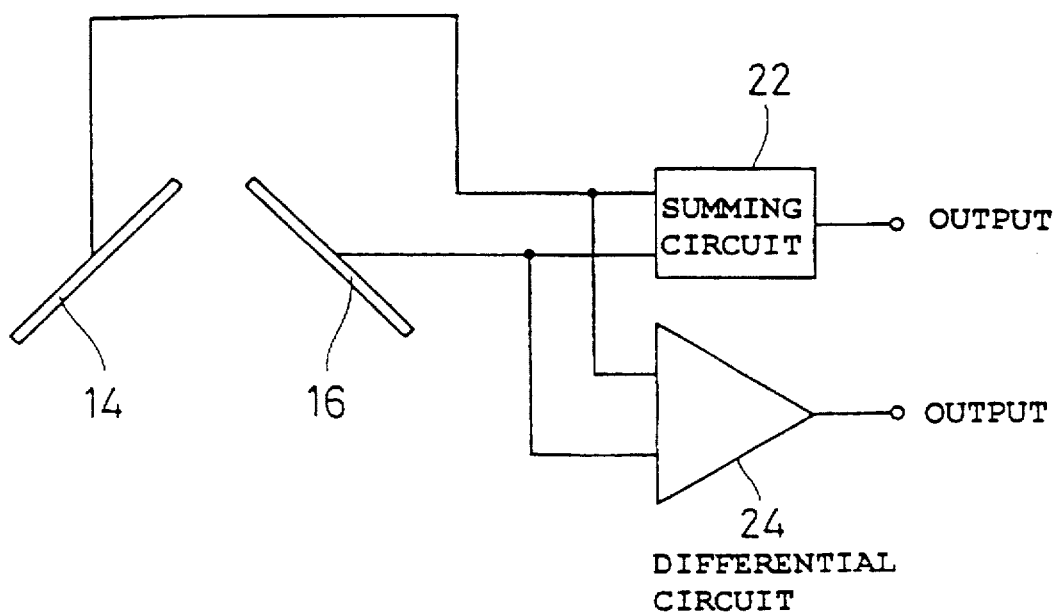
FIG. 2 is a view showing first and second acceleration sensors used for the acceleration sensor shown in FIG. 1 and a detection circuit therefor.

In the acceleration sensor 10, the first and second acceleration sensors 14 and 16 are connected to a summing circuit 22 and a differential circuit 24 as shown in FIG. 2. The summing circuit 22 outputs the sum of the output signals of the acceleration sensors 14 and 16. The differential circuit 24 outputs the difference between the output signals of the acceleration sensors 14 and 16.

Figure 3:
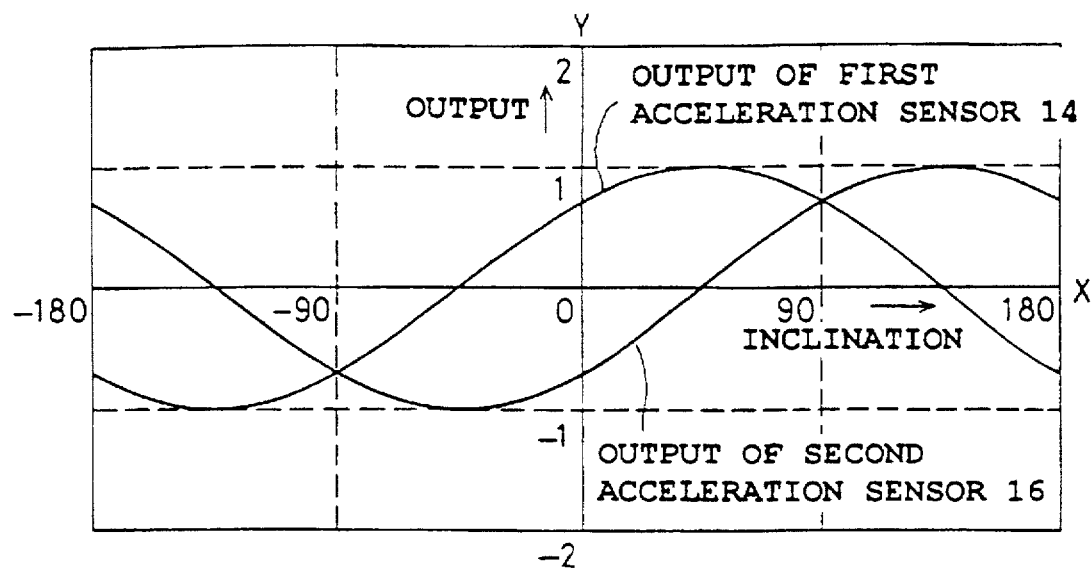
FIG. 3 is a chart showing the inclination of a car and the relationship between the output signals of the first acceleration sensor and the second acceleration sensor with respect to the gravitational acceleration.

Since the first and second acceleration sensors 14 and 16 are disposed in the acceleration sensor 10 such that they have an angle of 45° with respect to the plumb plane, signals having a phase difference between them of 90° are output as shown in FIG. 3 when the gravitational acceleration is applied. When the car 20 is located in a level place, i.e., the car is not slanted, signals having opposite polarities to each other are obtained from the acceleration sensors 14 and 16. This is because the gravitational acceleration is applied to the acceleration sensor 14 in the same direction as the direction of arrow A, while the gravitational acceleration is applied to the acceleration sensor 16 in the opposite direction to arrow B. When the car is located on a slope or the like, and, for example, the first acceleration sensor 14 is parallel to the plumb plane (i.e., X=−45 degrees in FIG. 3), the output signal from the first acceleration sensor 14 is 0. In this case, since the second acceleration sensor 16 is disposed perpendicularly to the plumb plane, the level of the output signal from the second acceleration sensor 16 is the maximum. When the car 20 is slanted in the opposite direction, and the signal output from the second acceleration sensor 16 becomes 0 (i.e., X=45 degrees in FIG. 3), the level of the signal output from the first acceleration sensor 14 becomes the maximum.

Figure 4:
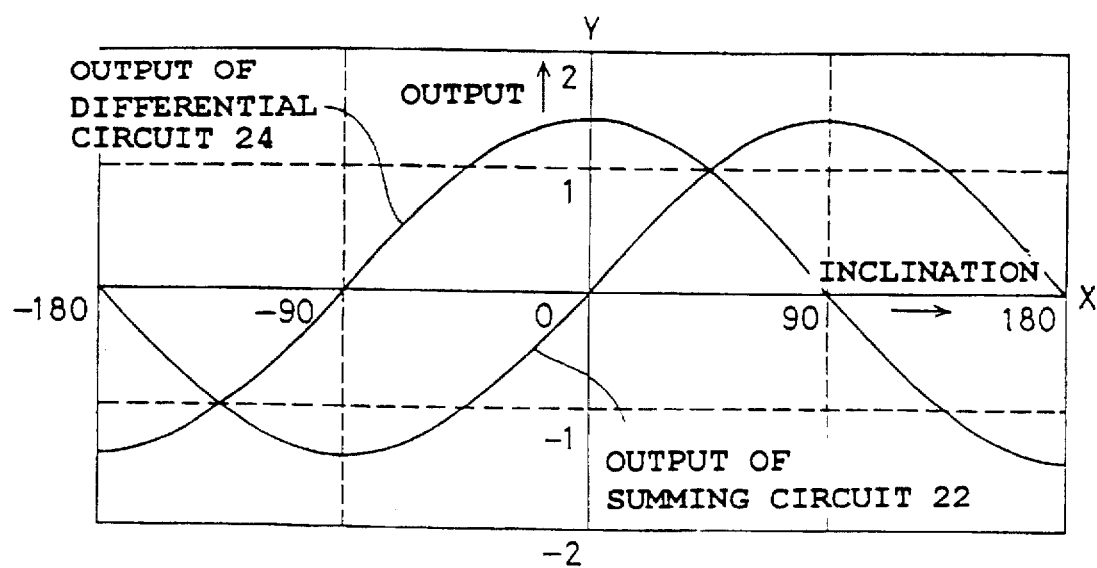
FIG. 4 is a chart showing the inclination of the car and the relationship between the output signals of a summing circuit and a differential circuit with respect to the gravitational acceleration.

The signals from the first and second acceleration sensors 14 and 16 are input to the summing circuit 22 and the differential circuit 24. Then, as shown in FIG. 4, the summing circuit 22 and the differential circuit 24 output signals having an amplitude about 1.4 times as large as the output level of the acceleration sensors 14 and 16 and having a phase difference of 90° with respect to the gravitational acceleration. As understood from FIG. 4, when the car 20 is located in a level place (X=0 degrees), the signal output from the summing circuit 22 is 0 and the signal output from the differential circuit 24 indicates the maximum level. This is because the acceleration sensors 14 and 16 output the same level of signals, while the signals are in opposite polarity with respect to each other as shown in FIG. 3. As a result, a signal having no influence of the gravitational acceleration can be obtained by measuring the output signal of the summing circuit 22.

Figure 5:
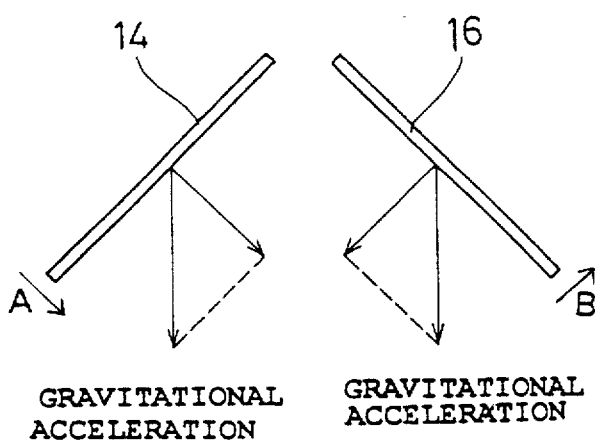
FIG. 5 is a view illustrating the gravitational acceleration applied to the first and second acceleration sensors, and the components of the gravitational acceleration in the direction perpendicular to these acceleration sensors.
Figure 6:
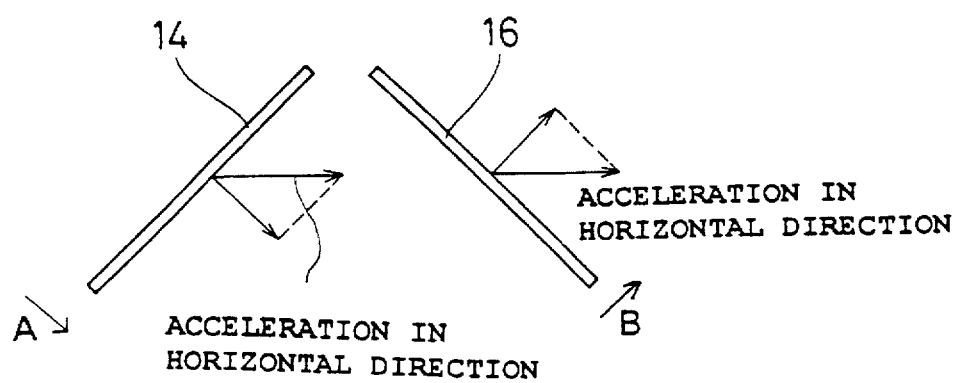
FIG. 6 is a view illustrating the horizontal acceleration applied to the first and second acceleration sensors, and the components of the horizontal acceleration in the direction perpendicular to these acceleration sensors.

When the car 20 moves in the direction from the second acceleration sensor 16 to the first acceleration sensor 14, i.e., the car 20 shown in FIG. 1 moves and accelerates forward, a force is applied in the direction from the first acceleration sensor 14 to the second acceleration sensor 16. The acceleration sensors 14 and 16 output signals in response to the force. In this case, both the force caused by an acceleration of the car 20 and the gravitational acceleration must be considered. FIG. 5 shows the force caused by the gravitational acceleration, and FIG. 6 shows the force caused by the acceleration of the car 20. As understood from FIG. 5, the perpendicular force component due to the gravitational acceleration is applied to the acceleration sensor 14 in the same direction as the direction of arrow A, while the perpendicular force component due to the gravitational acceleration is applied to the acceleration sensor 16 in the opposite direction to arrow B. Therefore, the acceleration sensors 14 and 16 output signals having opposite polarity. On the other hand, as understood from FIG. 6, the perpendicular force components due to the acceleration of the car 20 are applied to the acceleration sensors 14 and 16 in the same directions as those of arrows A and B, respectively. Therefore, the acceleration sensors 14 and 16 output signals having the same polarity.

As a result, a large output signal with respect to the acceleration of the car 20 in the travel direction can be obtained from the summing circuit 22 in response to acceleration caused by the movement of the car 20. On the other hand, if necessary, a large output signal with respect to the gravitational acceleration can be obtained from the differential circuit 24 without being influenced by the acceleration caused by the movement of the car 20.

As described above, a signal corresponding only to horizontal acceleration and which is not influenced by the gravitational acceleration can be obtained in this acceleration sensor 10. Since the output signal of the summing circuit 22 is the sum of the output signals of the first and second acceleration sensors 14 and 16, a large signal corresponding to the horizontal acceleration can be obtained. Therefore, the horizontal acceleration can be correctly detected and the speed and travel distance can be obtained by integrating the acceleration.

Furthermore, even when the car 20 vibrates, since the vibration is applied in the same direction as that of the gravitational acceleration, the summing circuit 22 does not output a signal corresponding to the vibration.

Figure 7:
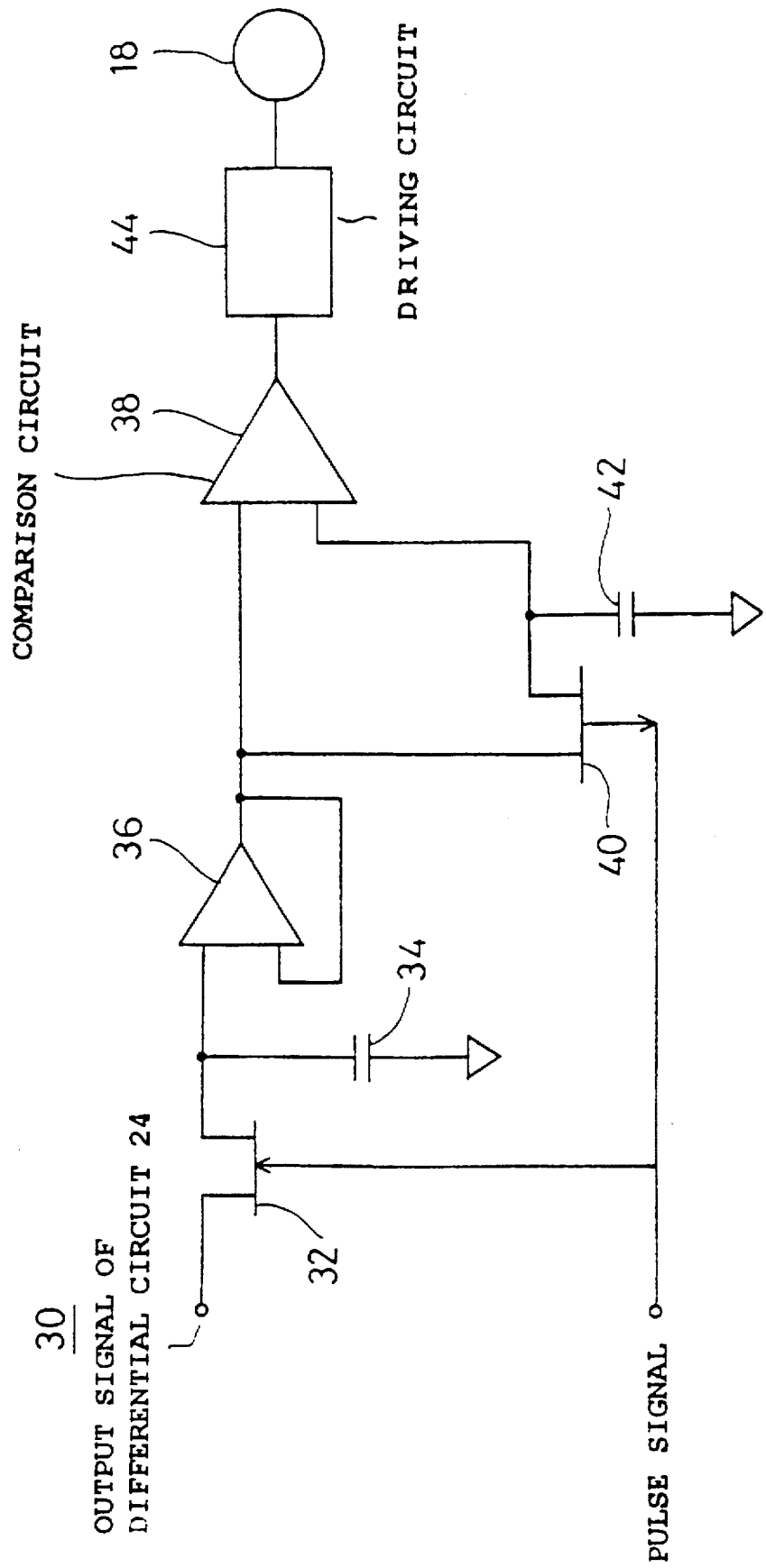
FIG. 7 is a circuit diagram of an example of a control circuit for adjusting the positions of the first and second acceleration sensors.

When the car 20 moves on a slope or the like, the position of the case 12 is controlled by the servomotor 18. For this purpose, a control circuit 30 shown in FIG. 7 is used, for example. This control circuit 30 includes a first FET 32, and the output signal of the differential circuit 24 is applied to the first FET 32. The first FET 32 is connected to a first capacitor 34 and a buffer circuit 36. The output signal of the buffer circuit 36 is supplied to one input terminal of a comparison circuit 38, and to a second FET 40. The second FET 40 is connected to the other input terminal of the comparison circuit 38 and a second capacitor 42. The comparison circuit 38 is connected to a driving circuit 44 for driving the servomotor 18.

Figure 8:
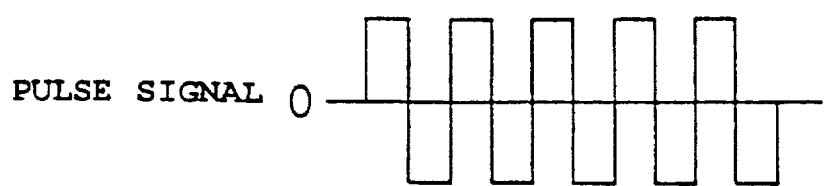
FIG. 8 is a waveform chart showing the pulse signal input to the two FET gates in the control circuit shown in FIG. 7.

The gate of the first FET 32 and the gate of the second FET 40 receive a pulse signal having a frequency of about 10 Hz shown in FIG. 8, for example. The first FET 32 operates during the positive portions of the input pulse signal. The second FET 40 operates during the negative portions of the input pulse signal. Therefore, the first FET 32 and the second FET 40 operate alternately according to the input pulse signal.

When the first FET 32 is turned on, the output signal of the differential circuit 24 is held at the first capacitor 34, and the voltage at the first capacitor 34 is output to the buffer circuit 36. When the second FET 40 is turned on, the output signal of the buffer circuit 36 is held at the second capacitor 42. Then, the output signal of the buffer circuit 36 and the output signal of the second capacitor 42 are compared by the comparison circuit 38. The driving circuit 44 receives the output of the comparison circuit 38, and in response thereto, controls the servomotor 18 so as to make the signals input to the comparison circuit 38 equal.

When the car 20 is located at a level place, the level of the output signal of the differential circuit 24 is the maximum. In this case, the signal output from the first FET 32 is always constant, and the signal held at the first capacitor 34 and the signal held at the second capacitor 42 are the same. Therefore, the two signals input to the comparison circuit 38 are the same, and the servomotor 18 does not operate.

When the car 20 moves on a slope or the like, since the acceleration sensors 14 and 16 become asymmetrical to each other with respect to the plumb plane, the level of the output signal of the differential circuit 24 decreases as the angle of inclination of the car becomes larger. Hence, the output signal of the first FET 32 becomes smaller as time passes. Therefore, when the first FET 32 is turned on at a certain time and a signal is held at the first capacitor 34, the second capacitor 42 holds the preceding signal. In other words, the second capacitor 42 holds a larger signal than the signal held at the first capacitor 34. Therefore, the signals input to the comparison circuit 38 have a difference, and the servomotor 18 is driven by the driving circuit 44.

As described above, the case 12 is rotated to adjust the positions of the acceleration sensors 14 and 16 so that the signals input to the comparison circuit 44 are the same. At the point where the output signal of the differential circuit 24 becomes stable, namely, at the point where the output signal has its maximum level, the servomotor 18 stops. In this case, the first and second acceleration sensors 14 and 16 have a symmetrical positional relationship with reference to the plumb plane. Therefore, with the use of this control circuit 30, the acceleration sensors 14 and 16 can be controlled such that they are always symmetrical with reference to the plumb plane irrespective of the conditions of the road on which the car 20 moves. Hence, horizontal acceleration without the influence of the gravitational acceleration can always be obtained with the use of this acceleration sensor 10.

As described above, the acceleration sensor 10 prevents the influences of the gravitational acceleration and vibration, and horizontal acceleration can be obtained. Therefore, the acceleration sensor can be applied to a car navigation system or the like. The position of a car can be correctly displayed on a map illustrated on a display unit without compensation. In addition, since the gravitational acceleration is offset, high-precision acceleration sensors are not required for the acceleration sensors 14 and 16, so a low-cost acceleration sensor 10 can be manufactured.

In the foregoing embodiment, the summing circuit 22 detects horizontal acceleration and the differential circuit 24 detects the gravitational acceleration. According to the polarities of the output signals of the acceleration sensors 14 and 16, the relationship between the summing circuit 22 and the differential circuit 24 may be reversed. For example, if one of the output signals of the acceleration sensors 14 and 16 has its polarity inverted with respect to that in the above embodiment, the acceleration sensors 14 and 16 output the signals of the same polarity in the case where the acceleration sensors 14 and 16 are subjected to forces in the directions shown by arrows A and C in FIG. 1. In that case, the summing circuit 22 outputs the signal corresponding to the gravitational acceleration and the differential circuit 24 outputs the signal corresponding to horizontal acceleration. The output signal of the summing circuit 22 is input to the control circuit 30.

The first acceleration sensor 14 and the second acceleration sensor 16 may be mounted at an angle other than 45° with respect to the plumb plane. In short, when the two acceleration sensors 14 and 16 are disposed such that they are neither parallel nor perpendicular to the plumb plane, signals caused by the gravitational acceleration can be offset.

In the above embodiment, the positions of the two acceleration sensors 14 and 16 are adjusted by the servomotor 18. However, any control method may be used which can control the sensors such that they are disposed symmetrically with reference to the plumb plane.

Without any limits, any type of acceleration sensor can be used as the two acceleration sensors 14 and 16.

While preferred embodiments of the invention have been disclosed, various modes of carrying out the principles disclosed herein are contemplated as being within the scope of the following claims. Therefore, it is understood that the scope of the invention is not to be limited except as otherwise set forth herein.

What is claimed is:

1. An acceleration sensor comprising:
   a first acceleration sensor and a second acceleration sensor both disposed neither parallel nor perpendicularly to a plumb plane, said first acceleration sensor and said second acceleration sensor being disposed such that they are symmetrical to each other with reference to said plumb plane;
   a summing circuit for obtaining the sum of an output signal of said first acceleration sensor and an output signal of said second acceleration sensor, and a differential circuit for obtaining the difference between the respective output signals of said first acceleration sensor and said second acceleration sensor,
   wherein acceleration in the horizontal direction is obtained from one of the output signals of said summing circuit and said differential circuit, and the gravitational acceleration is obtained from the other of the output signals of said summing circuit and said differential circuit.

2. An acceleration sensor according to claim 1, further comprising a control system for controlling the positions of said first acceleration sensor and said second acceleration sensor so as to maximize the output signal corresponding to said gravitational acceleration.

3. An acceleration sensor according to claim 2, wherein said control system maintains said first and second acceleration sensors symmetrical with respect to said plumb line.

4. An acceleration sensor according to claim 3, wherein said control system includes a servomotor and a control circuit which controls said servomotor in response to said signal corresponding to gravitational acceleration.

5. An acceleration sensor comprising:
   a first acceleration sensor and a second acceleration sensor both disposed neither parallel nor perpendicularly to a plumb plane, said first acceleration sensor and said second acceleration sensor being disposed such that they are symmetrical to each other with reference to said plumb plane; and
   a control system for controlling the positions of said first acceleration sensor and said second acceleration sensor so as to maximize the output signal corresponding to said gravitational acceleration.

6. An acceleration sensor according to claim 5, wherein said control system maintains said first and second acceleration sensors symmetrical with respect to said plumb line.

7. An acceleration sensor according to claim 6, wherein said control system includes a servomotor and a control circuit which controls said servomotor in response to said signal corresponding to gravitational acceleration.

8. An acceleration sensor comprising:
   a first acceleration sensor and a second acceleration sensor both disposed neither parallel nor perpendicularly to a plumb plane, said first acceleration sensor and said second acceleration sensor being disposed such that they are symmetrical to each other with reference to said plumb plane; and
   a control system for maintaining said first and second acceleration sensors disposed symmetrically with respect to said plumb plane.

9. An acceleration sensor according to claim 1, further comprising a control system for maintaining said first and second acceleration sensors disposed symmetrically with respect to said plumb plane.

* * * * *